United States Patent
Brokaw (10) Patent No.: US 9,327,746 B2
(45) Date of Patent: May 3, 2016

(54) ROLL-OUT CART WITH LID LATCH

(71) Applicant: Brokaw Industries, Inc., Cedar Rapids, IA (US)

(72) Inventor: Kim C. Brokaw, Cedar Rapids, IA (US)

(73) Assignee: Brokaw Industries, Inc., Cedar Rapids, IA (US)

( * ) Notice: Subject to any disclaimer, the term of this patent is extended or adjusted under 35 U.S.C. 154(b) by 0 days.

(21) Appl. No.: 14/724,249

(22) Filed: May 28, 2015

(65) Prior Publication Data

US 2015/0344224 A1 Dec. 3, 2015

Related U.S. Application Data (60) Provisional application No. 62/005,690, filed on May 30, 2014, provisional application No. 62/020,388, filed on Jul. 2, 2014.

(51) Int. Cl.

| | |
|---|---|
| *B60B 1/12* | (2006.01) |
| *B62B 1/10* | (2006.01) |
| *B65F 1/14* | (2006.01) |
| *B65F 1/16* | (2006.01) |

(52) U.S. Cl.
CPC ... *B62B 1/10* (2013.01); *B65F 1/16* (2013.01); *B65F 1/1473* (2013.01); *B65F 2001/1669* (2013.01)

(58) Field of Classification Search
CPC ........ B65F 1/1615; B65F 1/1646; B65F 1/16; B65F 1/421; B65F 1/1473; B65F 1/1468
USPC .......... 280/47.17, 47.24, 47.34, 47.35, 47.26, 280/79.2; 220/908, 495.06, 495.01, 264, 220/263, 262, 24, 315; 292/80, 81, 85, 292/DIG. 11, DIG. 38
See application file for complete search history.

(56) References Cited

U.S. PATENT DOCUMENTS

| | | | |
|---|---|---|---|
| 389,110 A * | 9/1888 | Roselius ....................... 292/130 |
| 4,134,608 A * | 1/1979 | Pool ............................... 292/76 |
| 5,071,024 A * | 12/1991 | Delmerico et al. ........... 220/832 |
| 7,100,791 B2 | 9/2006 | Berger | |
| 7,374,225 B2 | 5/2008 | Petelka | |
| 7,540,393 B2 | 6/2009 | Wong | |
| 7,988,009 B2 | 8/2011 | Cavalcante | |
| 2011/0214400 A1 | 9/2011 | Hanna et al. | |

* cited by examiner

*Primary Examiner* — John Walters
*Assistant Examiner* — James Triggs
(74) *Attorney, Agent, or Firm* — McKee, Voorhees & Sease, PLC (57) ABSTRACT

The present invention relates to a residential-sized waste disposal roll-out cart that includes a latch that automatically latches a lid in the fully opened position with the lid in close proximity to the side of the bin. When the bin is tilted on to the wheels to be rolled, the lid remains in close proximity to the side of the bin, rather than hanging down towards the ground. In this way, the lid remains out of the space where a user might step. A lid reinforcement structure may be used to increase the strength and wear of the lid where it engages the latch.

9 Claims, 9 Drawing Sheets

ROLL-OUT CART WITH LID LATCH

CROSS REFERENCE TO RELATED APPLICATIONS

This application claims priority under 35 U.S.C. §119 to provisional applications U.S. Ser. No. 62/005,690 filed May 30, 2014 and U.S. Ser. No. 62/020,388 filed Jul. 2, 2014, both of which are herein incorporated by reference in their entirety.

FIELD OF INVENTION

This invention relates generally to roll-out carts used to dispose of waste, and more specifically to improved roll-out carts that include a mechanism to hold the lid in a fully opened position.

BACKGROUND OF THE INVENTION

This invention relates generally to two-wheel roll-out carts that are used for garbage, recycling, and yard waste collection. These roll-out carts are residential-sized roll-out bins that are used to store waste for short periods of time before collection. Typically the bins hold about 50-100 gallons (220-440 liters) of waste, with the most popular current sizes being 95 gallons and 65 gallons. According to a common design, one side of the bin includes a handle structure at an upper end and a pair of wheels at a lower end. A lid is hingedly attached at this same side of the bin, commonly at the handle structure. The opposite side of the bin may be provided with a transverse bar that is used by an automated truck that collects the waste from the bin by lifting and tipping the bin. These rollout waste bins have made waste collection more efficient.

The large size of the bins permits the bins to hold a large volume of waste, thereby permitting a user to transport all of their garbage to the pickup location (typically roadside) in a single trip. The wheels are necessary, or at least highly desirable, to permit a user to maneuver a filled bin. In order to move the bin, a user tips the bin on to the two wheels using the handle and then pushes or pulls the bin in a rolling fashion.

In order to permit automated dumping of the bins, the hinge for the lid is offset from the large upper opening so as not to interfere with the flow of waste out of the bin when the bin is inverted for dumping. Due to the offset, the lid hangs down along the side of bin when fully opened. The free end (distal end) of the lid is near ground level when fully opened, especially so when the bin is tipped on to the wheels to be moved.

Figure 1A:
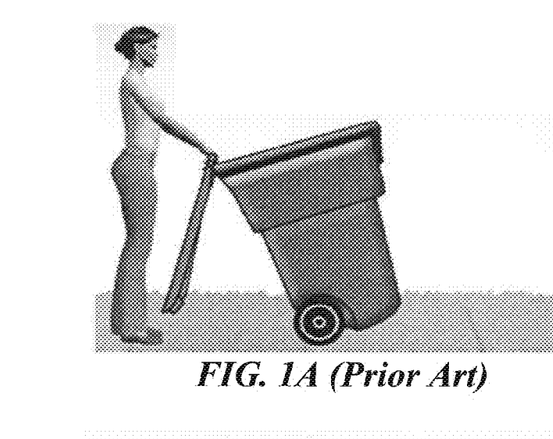
FIG. 1A is a side view of a prior art roll-out cart with the lid in an open position, and the cart tilted for rolling.
Figure 1B:
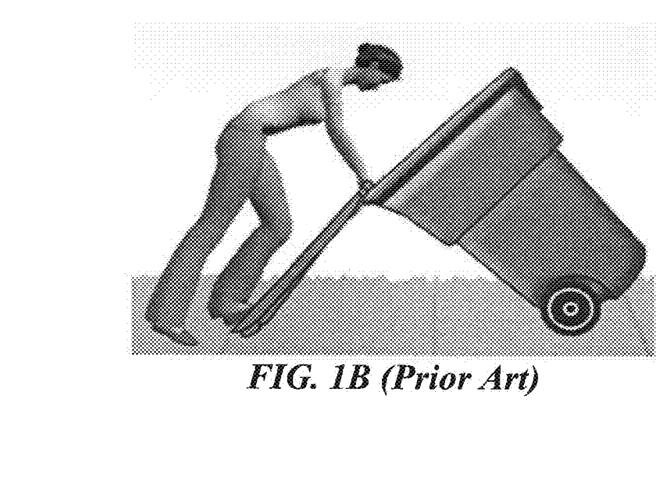
FIG. 1B shows the prior art cart of FIG. 1A with a user stepping the open lid.
Figure 1C:
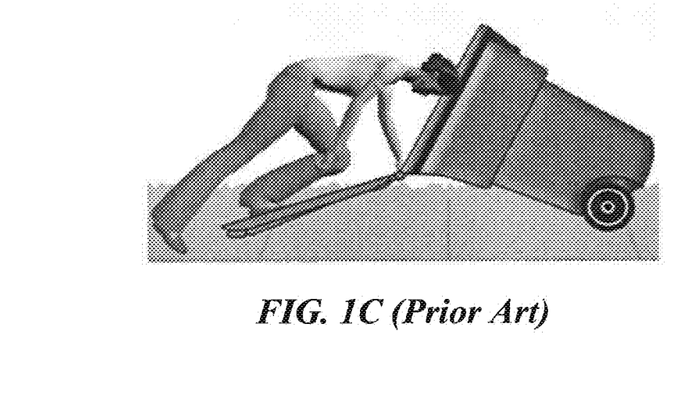
FIG. 1C shows the prior art cart of FIG. 1B with the user being pulled to the ground by the collapsing cart.
Figure 1D:
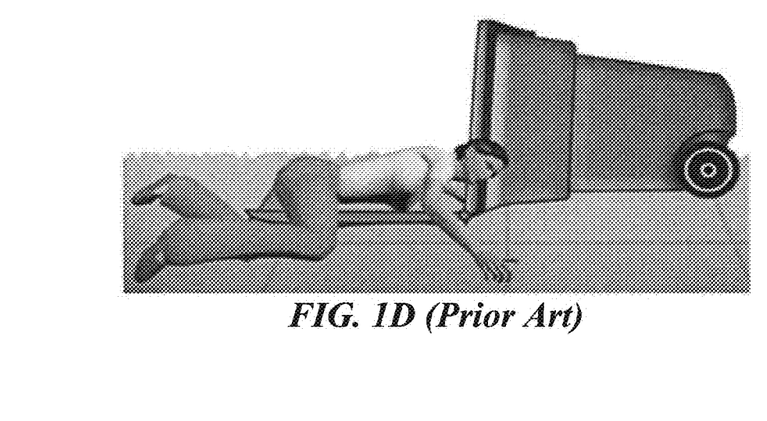
FIG. 1D shows the prior art cart of FIG. 1C with the user pulled all the way to the ground and against the cart.

This results in a surprisingly dangerous condition as illustrated in FIGS. 1A-D. Specifically, as the bin is tilted to the transport position, the lid can come into very close proximity or even into contact with the ground as shown in FIG. 1A. In this position, it is easy for a user to inadvertently step on the lid as shown in FIG. 1B. With the user stepping on the lid, the wheels can continue to roll away from the user for a short distance, but the upper portion of the bin is constrained by the lid, which can cause the bin to suddenly and violently tip over onto the ground as shown in FIG. 1C. This sudden and unexpected tipping of the bin can trip and pull the user to the ground, which can injure the user either from direct contact with the bin or the ground as seen in FIG. 1D. Cuts, contusions, broken bones, broken eye sockets, concussions, neck injuries, and strained ligaments are common injuries.

Some roll-out waste carts include mechanisms for supporting the lids in a partially open position (typically about 80-120 degrees from the closed position). An example of this feature is shown, for example in U.S. Patent Publication No. 2011/0214400. This feature of holding the lid in a partially opened position is provided so that a user does not need to open the lid every time they want to add waste to the bin, and so a that user does not need to choose between fully opening the lid, which can require significant clearance space, or supporting the lid with the user's hand while adding waste, which can be cumbersome. Unfortunately, supporting the lid in a partially opened position often exacerbates the instability problem because it moves weight up and often outside the base of support for the bin, and because the partially opened lid extending above the waste bin can catch wind. All of these factors tend to make the waste bin less stable and prone to tipping.

A safer alternative is needed.

SUMMARY OF THE INVENTION

The present invention relates to an improved residential-sized waste disposal roll-out cart that is safer than existing products. Specifically, one of the dangers of residential-sized waste bins of the type described herein is that the lid comes into close proximity or contact with the ground when the wheeled bin is tilted to permit rolling transportation of the bin. The lid is then subject to snagging, or commonly being stepped upon by a user, which can cause the cart to suddenly and unexpectedly tip over, which can cause significant trauma to a user, including bruises, lacerations, contusions, and fractures. The present invention overcomes this difficulty by automatically latching the lid in the fully opened position with the lid in close proximity to the side of the bin. Accordingly, when the bin is tilted on to the wheels to be rolled, the lid remains in close proximity to the side of the bin, rather than hanging down directly towards the ground. In this way, the lid remains out of the space where a user might step. Furthermore, the lid secured in the fully open position is much less likely to snag on the ground, and will not be pulled back to a dangerous position if it does snag the ground. Preferably, the weight of the lid will be sufficient to automatically activate the latch, such that the lid will be captured in the fully opened position, simply by virtue of opening the lid and allowing it to fall to its fully opened position. When it is desired to close the lid, a user can simply adjust the latch to a released position and rotate the lid back to the fully closed position.

According to one embodiment, the present invention is a waste disposal roll-out cart that has a container with an open top. The container has a handle at a first side of the container. A pair of wheels is mounted to the container proximate to the first side of the container. A lid is hingedly attached to the container proximate to the first side of the container. The lid is adjustable between a closed position covering the open top and a fully open position wherein a free end of the lid is rotated to be proximate to the first side of the container. A latching assembly automatically engages the lid to retain the lid in the fully open position. The latching assembly may include a base plate mounted to the container with a resilient arm extending from the base. A catch structure may be provided at a free end of the resilient arm. The catch structure includes a catch that extends below the resilient arm and a cam surface that faces generally outwardly away from the container. The resilient arm urges the catch into a catching position that interferes with an arc of rotation for the lid to retain the lid in the fully open position. The lid may include a reinforcing structure at an inner edge that contacts the catch as the lid moves into the fully open position from a closed position. The base plate may be located at handle supporting structure.

According to another embodiment, the present invention is a method of moving a waste disposal roll-out cart. The rollout cart has a container with an open top, a handle on the container at a first side of the container, a pair of wheels mounted to the container proximate to the first side of the container, a lid hingedly attached to the container proximate to the first side of the container, the lid being adjustable between a closed position covering the open top and a fully open position wherein a free end of the lid is rotated to be proximate to the first side of the container; and a latching assembly that automatically engages the lid to retain the lid in the fully open position. The lid is adjusted to the fully open position such that the lid is engaged by the latching assembly. The roll-out cart is tilted toward the first side such that the roll-out cart is completely supported on the wheels with the lid remaining in the fully open position retained by the latching assembly. The tilted cart is rolled on the wheels with the lid remaining in the fully open position retained by the latching assembly.

DETAILED DESCRIPTION OF PREFERRED EMBODIMENTS

Figure 2:
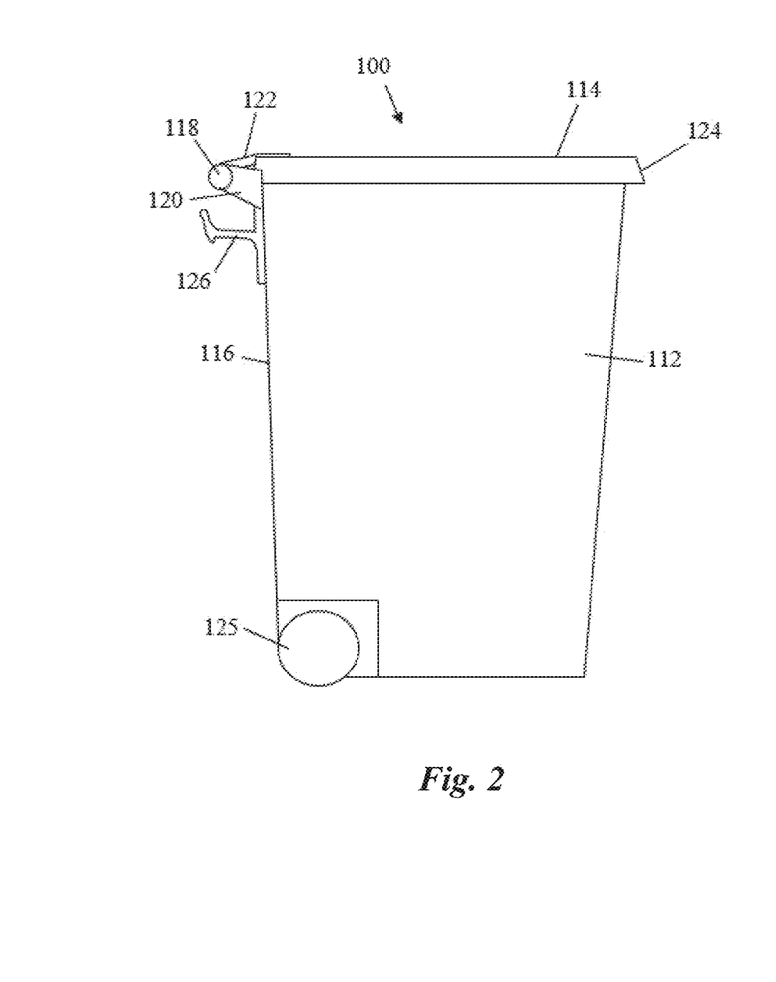
FIG. 2 is a side elevation view of a rollout cart according to one embodiment of the present invention, with the lid in a closed position.
Figure 3:
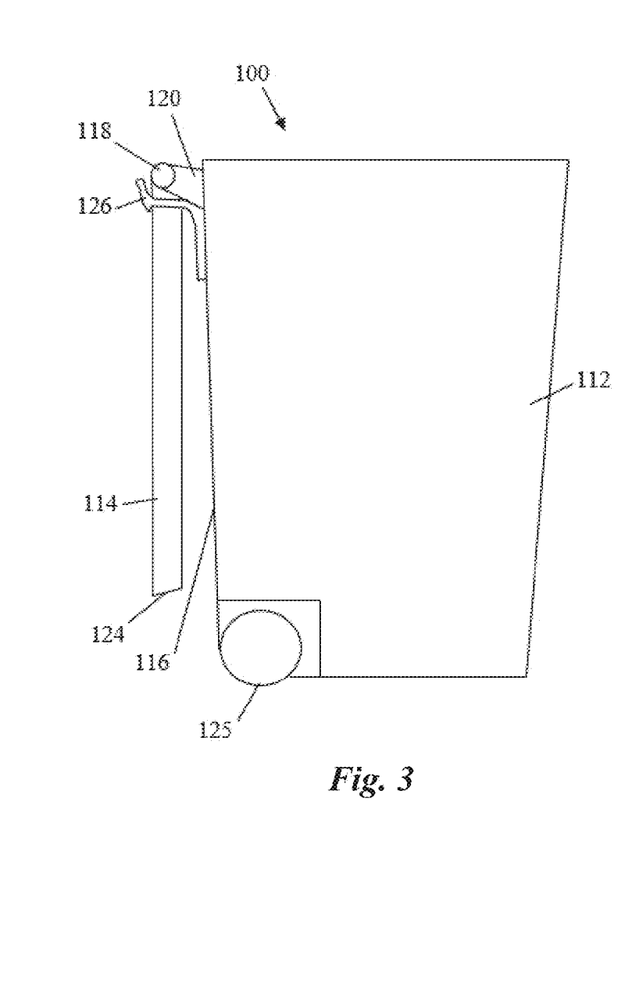
FIG. 3 the rollout cart of FIG. 2, with the lid retained in an open position by an automatic latch mechanism.
Figure 4:
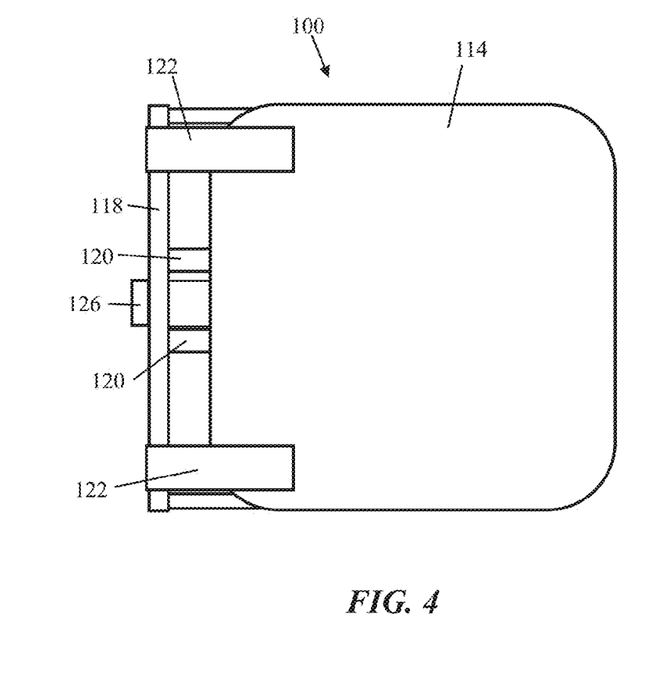
FIG. 4 is a top plan view of the waste bin of FIG. 2.
Figure 5:
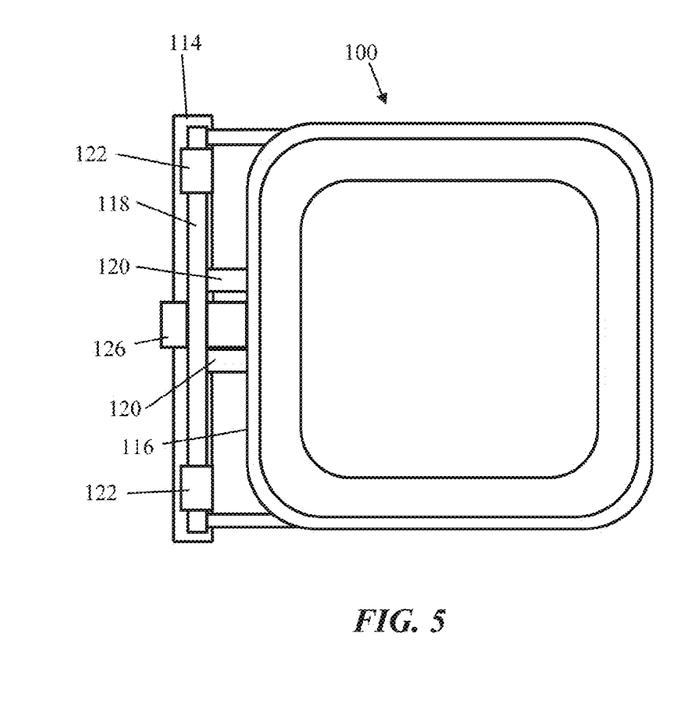
FIG. 5 is a top plan view of the waste bin of FIG. 3.

FIGS. 2-5 show a rollout cart 100 according to one embodiment of the present invention. The rollout cart 100 is of the type commonly used to dispose of residential waste, such as trash, recyclable waste, and yard waste. The rollout cart 100 includes a large container 112 with an open top that can be selectively covered by a lid 114. In FIGS. 2 and 4 the lid 114 is in a closed position completely covering the top opening of the container 112. In FIGS. 3 and 5 the lid 114 has been rotated to a fully opened position with the lid 114 hanging more or less straight down along the backside 116 of the container 112. A handle 118 is mounted to the backside 116 of the container 112 by a plurality of handle supports 120 near the upper end of the container 112. The handle 118 may be used as the male portion of a hinge joint for the lid 114. Specifically, hinge connectors 122 may be used to hingedly attach the lid 114 to the handle 118. Alternatively, the lid 114 may be hinged to separate structure provided at the backside 116 of the container 112. Accordingly, to move the lid 114 from the closed position of FIG. 2 to the fully opened position of FIG. 3, the user simply pulls the lid 114 generally upwardly and rearwardly, such that the free end 124 rotates around the handle 118 (in a counterclockwise direction as shown in FIGS. 1 and 2). The lid 114 rotates through an angle of about 270 degrees between the closed and open positions. Once the lid 114 is moved such that its center of gravity is beyond the joint formed at the handle 118, gravity will automatically urge the lid 114 to the completely open position of FIG. 3, wherein the lid 114 is hanging generally directly below the handle 118. A pair of wheels 125 is mounted at a lower portion of the container 112 at or near the backside 116 such that the wheels 125 are generally on the same side of the container 112 as the handle 118.

The structure of the rollout cart 100 described so far is a common and well-known structure used at millions of residences around the world.

The rollout cart 100 shown in FIGS. 2-5 also includes a latch 126 that is unique and greatly improves the safety and convenience of the rollout cart 100. The latch 126 will automatically capture and retain the lid 114 in the fully opened position of FIGS. 3 and 5 when the lid 114 is opened. The weight of the lid 114 is sufficient to move the lid past the latch 126 into the open position of FIG. 3. The latch 126 thereby permits a user to move the cart 100 without the lid 114 swinging to a position where it is prone to being stepped upon by the user. The latch 126 can be adjusted by a user to permit the user to rotate the lid 114 back to the closed position of FIGS. 2 and 4, when desired.

Figure 6:
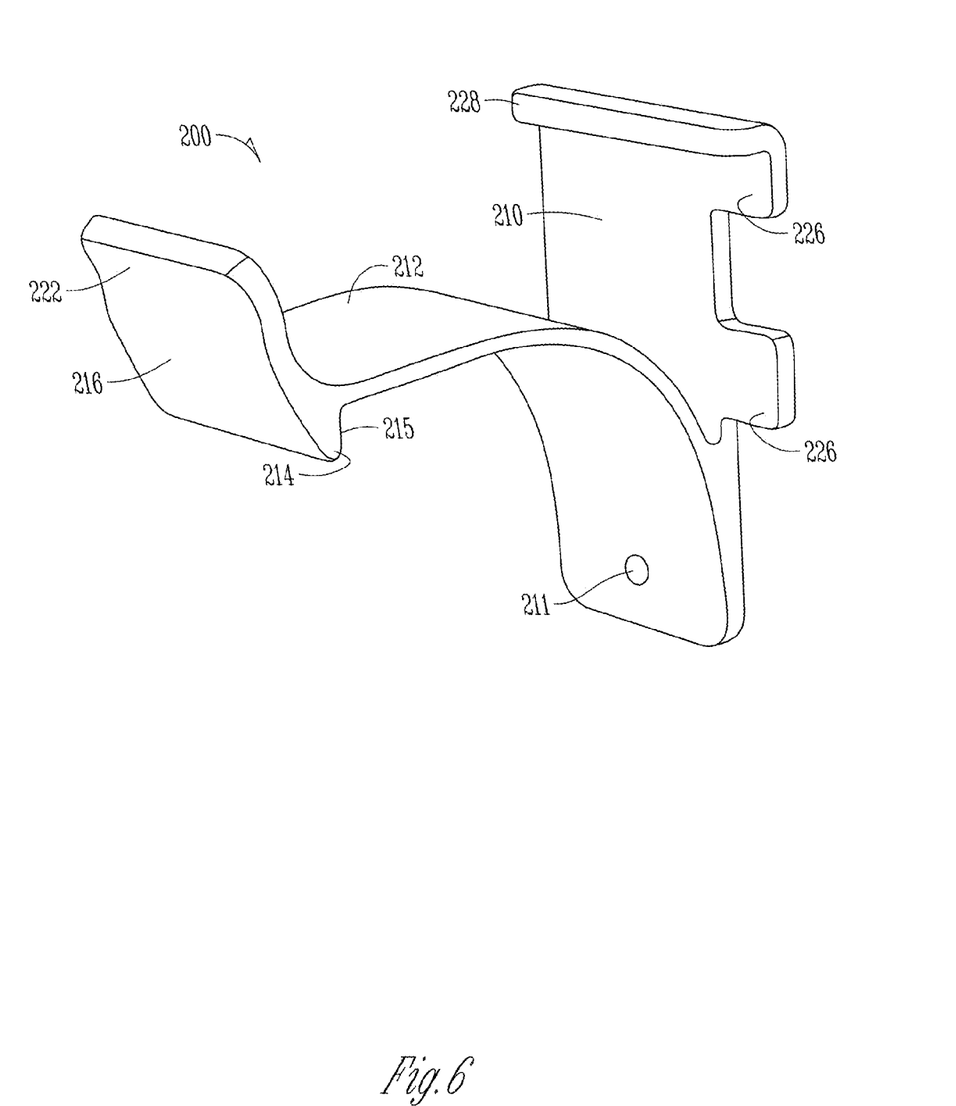
FIG. 6 is a perspective view of a resilient latch according to one embodiment of the present invention.
Figure 12:
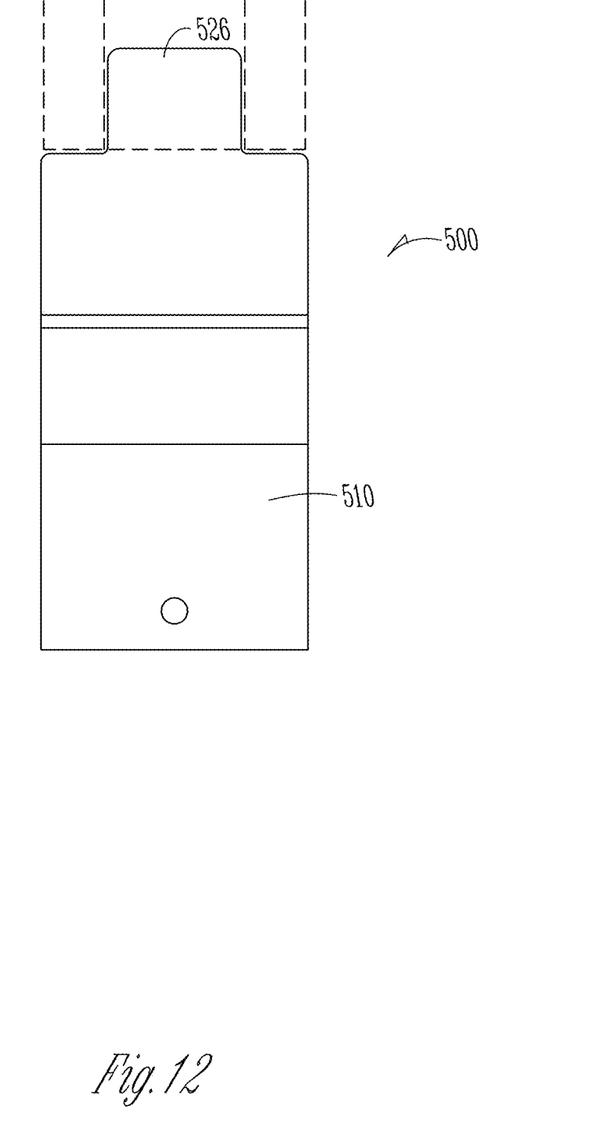
FIG. 12 is a front elevation view of an alternative embodiment of a resilient latch with a locator tab at a top portion of the latch, showing handle support structure in broken lines, with the locator tab received within the handle support structure.

FIG. 6 shows an embodiment of a resilient latch 200 that could be used as the latch 126 of FIGS. 2-5. The latch 200 includes a base 210 that is adapted to be mounted to a container. The base 210 is a flat plate that is suitable for attachment to the side of a container, for example by using bolts, lock washers, and nuts, or rivets, or other known attachments mechanisms through opening 211. A resilient arm 212 extends from the base 210. A catch 214 is mounted at the free end of the resilient arm 212 and extends below the arm 212 to capture the proximal edge of the lid between the inner side 215 of the catch 214 and the container. The outer side of the catch 214 has a cam surface 216 to flex the resilient arm 212 upward as the lid bears against cam surface 216. A handle portion 222 may be provided above the cam surface 216 to assist a user in moving the catch 214 to a released position that permits the lid to be rotated from the fully open position back to the closed position. The embodiment of FIG. 6 also includes tabs 226 that are used to locate the latch 200 relative to a handle support structure so that the latch 200 is properly located and aligned to interact with the container lid. Specifically, the tabs 226 will align with, or interact with, a portion of the handle support structure so that the latch is located uniformly on each container. A lip 228 extends inwardly at a top portion of the base 210. The lip 228 may also be useful for locating and securing the latch 200 under a top lip of the container 240. The latch 200 may be applied to new rollout carts, or may be used to retrofit existing fleets of rollout carts. The resilient arm 212 is shaped such that it will permit the catch 214 at the free end of the arm 212 to flex generally up and down. FIG. 12 shows another embodiment of a resilient latch 500 that is similar to the latch 200 of FIG. 6, except that the tab 526 is located at an upper portion of the base 510. The tab 526 can be used to locate the latch 500 at a handle support structure (shown in dashed lines) that has a downward facing opening that receives the tab 526 so that the latch 500 is located and oriented in a desired and uniform position. Alternatively, the tabs 226 or 526 can align with other features of the container, such as reinforcement structures, to properly position and align the latch 200 or 500 to interact with the lid.

The latch 200 may be a unitary injection molded article formed from nylon, polyethylene plastic, or other suitable material. The important qualities are that the arm 212 has sufficient resilience and durability to permit repeated flexing as the lid moves in and out of the fully open position, that the base 210 be sufficiently strong to permanently secure the latch 200 to a container, that the catch 214 have sufficient strength to retain the lid in the fully open position, and that the cam surface 216 be smooth and durable enough to permit the lid to slide across it without catching or undue wear. Other plastics, metals, and composite materials may be use used. Alternatively, the latch 200 could be integrally formed with the container, for example during a molding process for the container itself.

Figure 7:
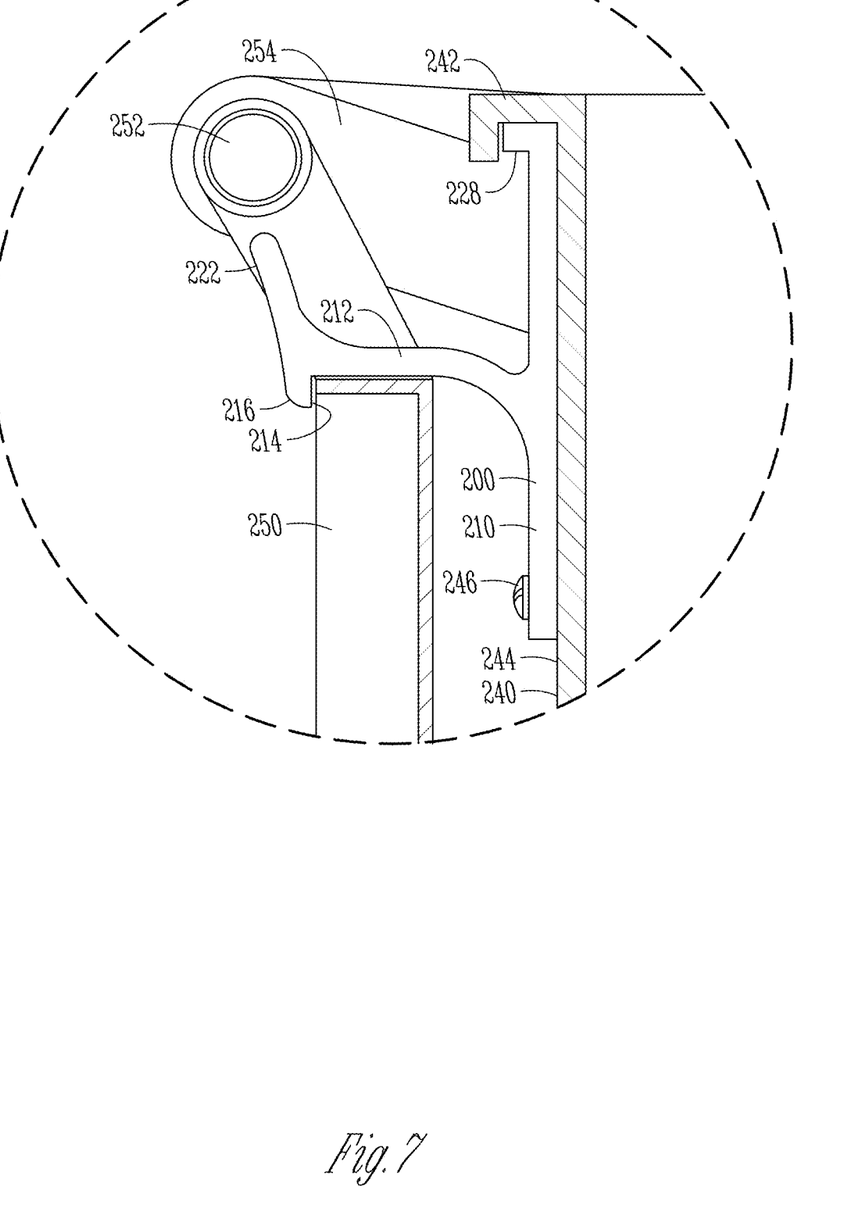
FIG. 7 is a partial cross-sectional elevation view of a rollout cart with the resilient latch of FIG. 6 with the lid in an open position.

FIG. 7 shows the latch 200 of FIG. 6 mounted to a rear side 244 of a container 240. The container 240 may be an existing rollout cart. As is typical, the container 240 may include a lip 242 that overhangs the side 244 to increase the stiffness of the container 240.

The latch 200 is mounted to the container 240 by a threaded fastener 246 provided through the base 210. The base 210 could also be attached to the container 240 using rivets. The lip 228 of the latch 200 fits under and engages the lip 242 of the container 240 to provide additional support and to properly locate the latch 200. The latch 200 may also be located against the handle support 254 using the tabs 226 (see FIG. 6).

Figure 8:
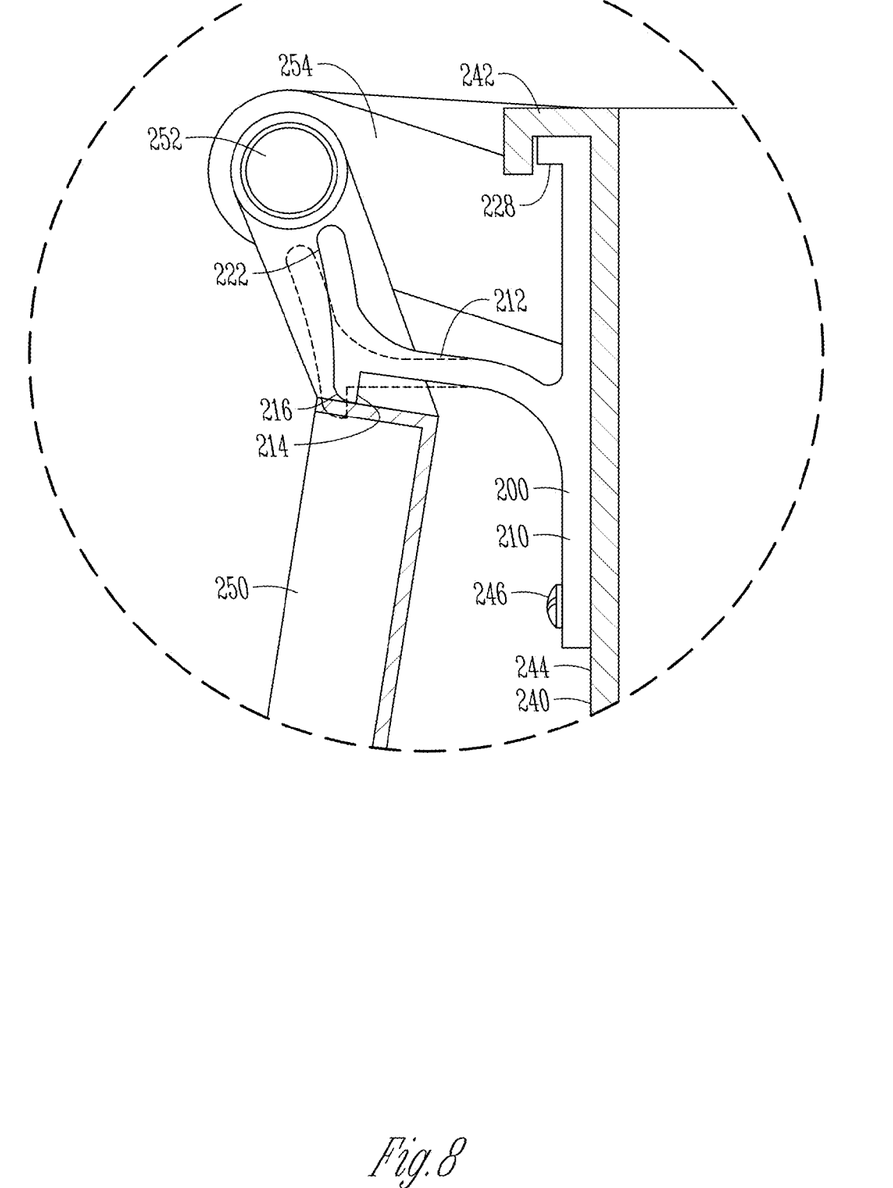
FIG. 8 is a partial cross-sectional elevation view of a rollout cart with the resilient latch of FIG. 6 with latch adjusted to a released position and the lid moved out of the fully open position.

In FIG. 7, the lid 250 is in the fully open position and is retained there by the catch 214. The handle 252 acts as hinge for the lid 250. In FIG. 8, the lid 250 is rotated towards the closed position. To move the lid 250 past the catch 214 to the position of FIG. 8, a user would pull on the handle portion 222 of the latch 200, which causes the resilient arm 212 to flex and move the catch 214 out of the arc of rotation of the inner portion of the lid 250. The user may be able to use the handle 252 as a support for the user's hand to pull against when moving the latch to the position of FIG. 8. It may be desirable to slightly angle the face of the catch 214 downwardly and toward the container 240 so that a strong pull on the lid 250 will free it from the catch 214 without damaging the latch 200 or the lid 250.

Gravity will urge the lid 250 from the position of FIG. 8 towards the fully opened position of FIG. 7. The inner edge of the lid 250 will engage and push against the cam surface 216 of the latch 200. The cam surface 216 is shaped concavely and facing generally downwardly and away from the back side of the container 240. As the inner corner of the lid 250 pushes against the cam surface 216 it will flex the resilient arm 212 causing the catch 214 to move upwardly until the lid 250 is clear of the catch 214. Once the lid 250 is clear of the catch 214, the resilient arm 212 will snap the catch back to the position of FIG. 7 to retain the lid 250 in the fully open position.

Figure 9:
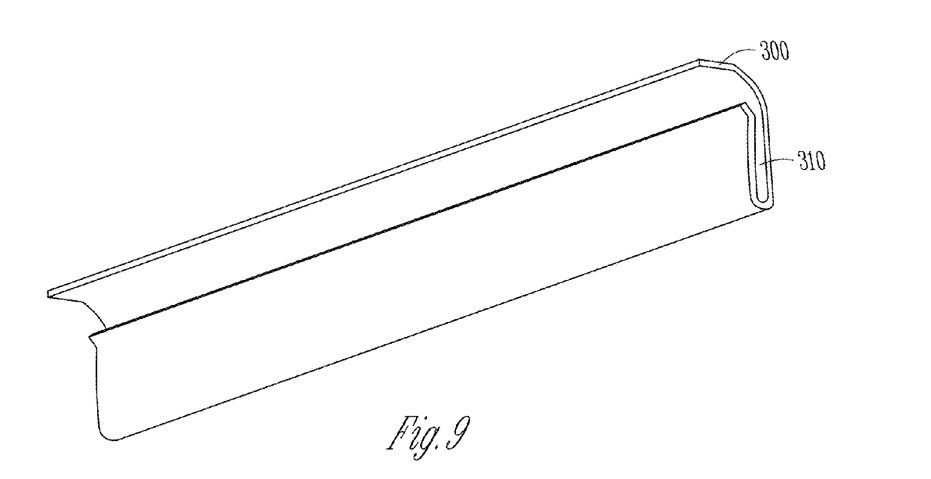
FIG. 9 is a perspective view of a lid stiffener according to one embodiment of the present invention.
Figure 10:
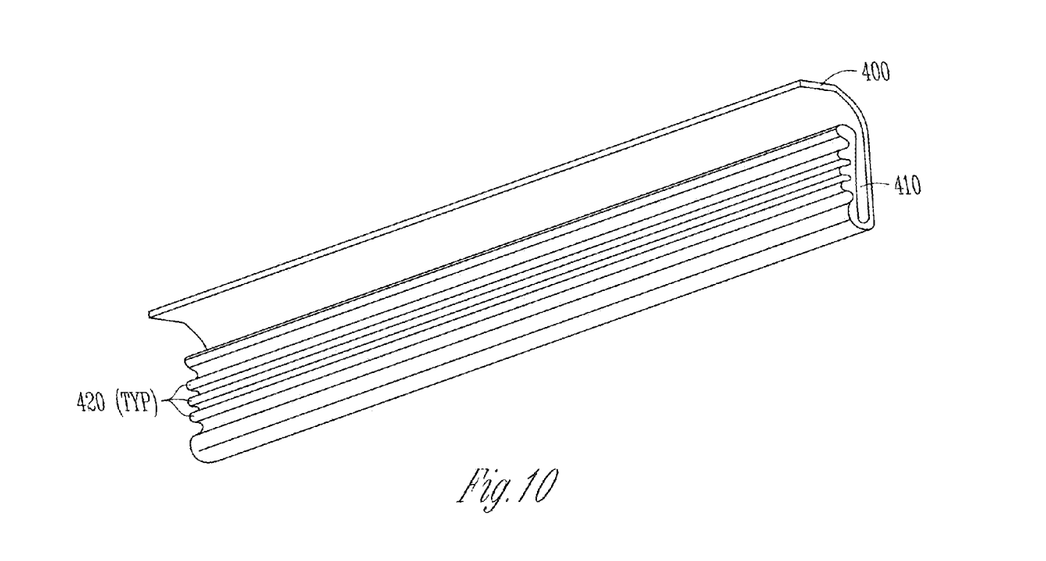
FIG. 10 is a perspective view of a lid stiffener that includes reinforcement ribs according to one embodiment of the present invention.

FIGS. 9 and 10 show lid stiffeners 300 and 400 that may be used to reinforce the portion of the lid 250 that engages the catch 214. In many instances a lid stiffener will not be needed as the lid will have sufficient strength and integrity without the stiffener. The stiffeners 300, 400 may be molded from resilient material such that they can be snapped into place on the lid 250 without use of any special tools or separate fasteners. Stiffener 400 includes ribs 420 that provide additional stiffness. The appropriate stiffener 300 or 400, or no stiffener, may be selected depending upon the needs.

Figure 11:
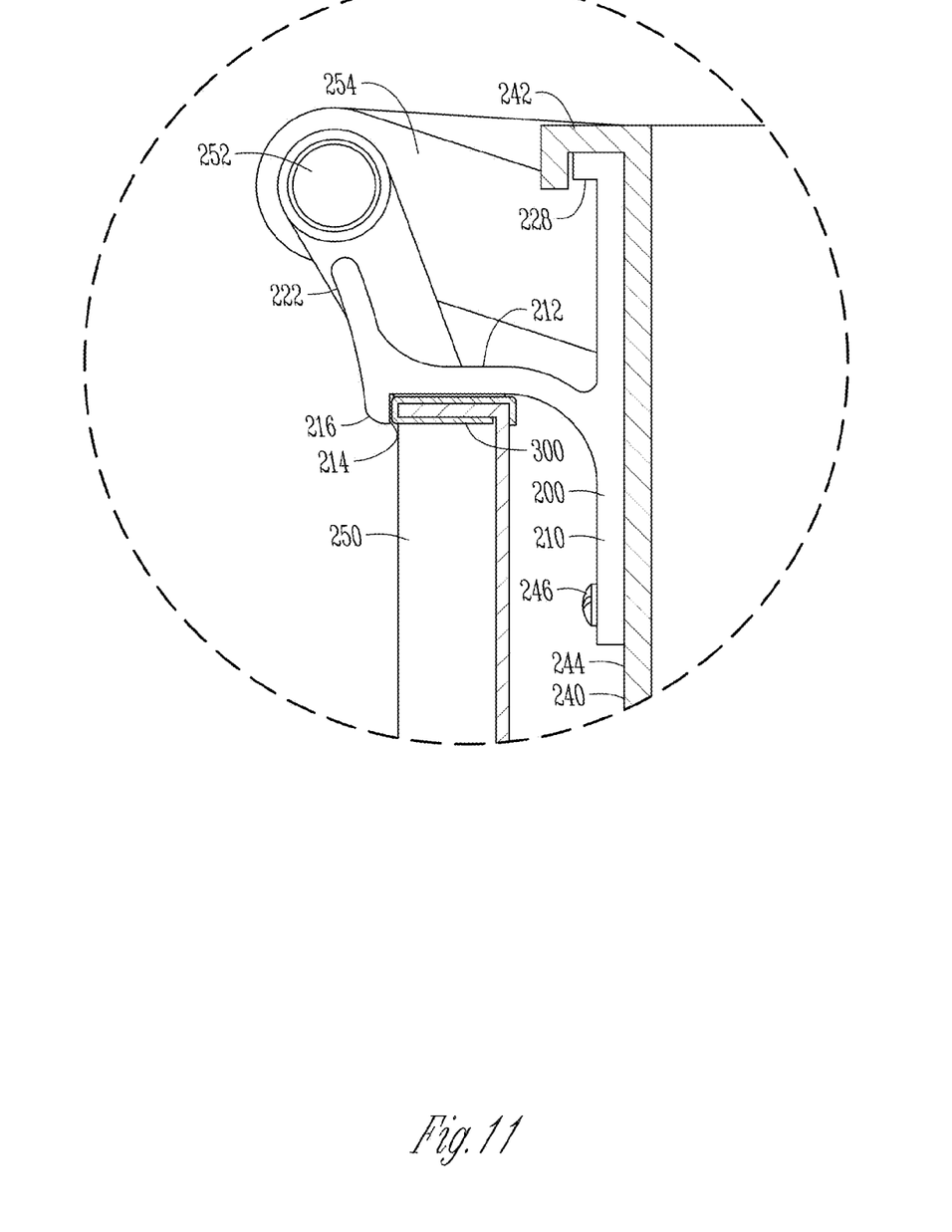
FIG. 11 is a partial side view of a lid with an attached lid stiffener according to one embodiment of the present invention.

FIG. 11 shows a lid 250 with a stiffener 300 in place on the lid 250. The stiffener 300 has an interference fit with an inner wall of the lid 250 to retain the stiffener 300 in place. The stiffener 300 stiffens the lid 250 and provides a wear surface that engages the cam surface 216 and catch 214 of the resilient 212.

Those with skill in the art will readily recognize that numerous structures may be substituted for the exact embodiment shown while still remaining within the spirit of the invention. For example, and without limitation, the latching assembly could be a magnetic catch and strike, a cam latch, a double roller catch latch, a compression latch, or a spring device. Furthermore, the latching assembly could be located near the bottom portion the container and include a release mechanism activated by the user's foot.

What is claimed:

1. A waste disposal roll-out cart comprising:
 a container with an open top;
 a handle on the container at a first side of the container;
 a pair of wheels mounted to the container proximate to the first side of the container;
 a lid hingedly attached to the container proximate to the first side of the container, the lid being adjustable between a closed position covering the open top and a fully open position. wherein a free end of the lid is rotated to be proximate to the first side of the container; and
 a latching mechanism that automatically engages the lid to retain the lid in the fully open position, the latching mechanism including:
  a base mounted to the container;
  a resilient arm extending from the base;
  a catch structure at a free end of the resilient arm, the catch structure including a catch that extends below the resilient arm and a cam surface that faces generally outwardly away from the container, and wherein the resilient arm urges t. e catch into a catching position that interferes with an arc of rotation for the lid to retain the lid in the fully open position.

2. The waste disposal roll-out can of claim 1, wherein the lid includes a reinforcing structure at an inner edge that contacts the catch as the lid moves into the fully open position from a closed position.

3. The waste disposal roll-out cart of claim 2, wherein the base is located in alignment with handle structure.

4. The waste disposal roll-out cart of claim 2, wherein the base is located in alignment with a container reinfbrcement structure.

5. The waste disposal roll-out cart of claim 2, wherein an upper portion of the base is located against an upper lip of the container.

6. The waste disposal roll-out cart of claim 2, wherein the base comprises a tab that is adapted to be inserted in a downward facing opening of a support structure for the handle to locate the latch on the container.

7. A method of moving a. waste disposal roll-out cart comprising:
 providing a roll-out cart, the roll-out cart having: a container with an open top, a handle on the container at a first side of the container, a pair of wheels mounted to the container proximate to the first side of the container, a lid hingedly attached to the container proximate to the first side of the container, the lid being adjustable between a closed position covering the open top and a fully open position wherein a free end of the lid is rotated to be proximate to the first side of the container; and a latching assembly that automatically engages the lid to retain the lid in the fully open position, the latching assembly including: a base mounted to the container, a resilient arm extending from the base, and a catch structure at a free end of the resilient arm. the catch structure including a catch that extends below the resilient arm and a cam surface that faces generally outwardly away from the container, and wherein the resilient arm urges the catch into a catching position that interferes with an arc of rotation for the lid to retain the lid in the fully open position;

rotating the lid into the fully open position such that the lid is engaged by the latching assembly;

tilting the roll-out cart toward the first side such that the roll-out cart is completely supported on the wheels with the lid remaining in the fully open position retained by the latching assembly; and rolling the tilted cart on the wheels with the lid remaining in the fully open position retained by the latching assembly.

8. The waste disposal roll-out cart of claim 1, wherein the catch is positioned proximate to the handle such that a user can use the handle as support when adjusting the catch out of the catching position to permit rotation of the lid out of the fully open position.

9. The waste disposal roll-out cart of claim 1, wherein the catch is positioned proximate to a location where the lid is hingedly attached to the container to catch an inner edge of the lid when the lid is in the fully open position.

* * * * *